United States Patent
Henry et al.

(10) Patent No.: US 7,593,373 B2
(45) Date of Patent: Sep. 22, 2009

(54) SNOOP-AND-SHORTCUT ROUTING METHOD FOR BETTER MOBILITY SUPPORT ON NETWORKS

(75) Inventors: Paul Shala Henry, Holmdel, NJ (US); Hui Luo, Marlboro, NJ (US)

(73) Assignee: AT&T Intelectual Property II, LP, Reno, NV (US)

( * ) Notice: Subject to any disclaimer, the term of this patent is extended or adjusted under 35 U.S.C. 154(b) by 1255 days.

(21) Appl. No.: 10/266,026

(22) Filed: Oct. 7, 2002

(65) Prior Publication Data

US 2003/0108036 A1   Jun. 12, 2003

Related U.S. Application Data

(60) Provisional application No. 60/339,958, filed on Dec. 12, 2001.

(51) Int. Cl.
  *H04L 12/28*   (2006.01)
  *H04L 12/66*   (2006.01)
  *H04W 4/00*    (2009.01)
  *G06F 15/16*   (2006.01)

(52) U.S. Cl. .................. 370/338; 370/395.52; 370/401; 709/230; 709/238

(58) Field of Classification Search .................. 370/338, 370/254, 255, 351, 355, 357, 356, 229, 252, 370/389, 395.52, 401; 709/230, 238, 202
See application file for complete search history.

(56) References Cited

U.S. PATENT DOCUMENTS

| | | | |
|---|---|---|---|
| 5,442,633 A | 8/1995 | Perkins | |
| 6,381,649 B1 * | 4/2002 | Carlson | 709/235 |
| 6,434,134 B1 * | 8/2002 | La Porta et al. | 370/338 |
| 6,496,505 B2 * | 12/2002 | La Porta et al. | 370/392 |
| 6,535,493 B1 * | 3/2003 | Lee et al. | 370/329 |
| 6,625,658 B1 * | 9/2003 | Oguchi et al. | 709/238 |
| 6,915,325 B1 * | 7/2005 | Lee et al. | 709/202 |
| 6,970,445 B2 * | 11/2005 | O'Neill et al. | 370/338 |
| 6,973,057 B1 * | 12/2005 | Forlow | 370/328 |
| 7,088,716 B2 * | 8/2006 | Sugai et al. | 370/392 |
| 7,103,679 B2 * | 9/2006 | Bonn | 709/245 |
| 7,123,587 B1 * | 10/2006 | Hass et al. | 370/238 |
| 7,239,618 B1 * | 7/2007 | La Porta et al. | 370/331 |

(Continued)

OTHER PUBLICATIONS

"Mobility Approaches for All IP wireless Networks" by Onur et al.*

(Continued)

*Primary Examiner*—Alpus H Hsu

(57) ABSTRACT

A shortcut routing method to improve packet routing between a visiting mobile host connected to a subnet and a communicating host on the network or the same subnet. When a router receives an IP tunnel packet from a network interface on the visited network, it checks the inner IP packet for its final destination. If the destination IP address of the inner IP packet can be reached from the same network interface, the router decapsulates the IP tunnel packet and sends the inner IP packet directly to the communicating host on the subnet. For every outbound IP packet sent to the communicating host by the visiting mobile host, a portion of the round trip between the mobile host and home agent, is thereby eliminated. Optionally, the router can shortcut IP packets to a visiting mobile host that remains on the same subnet as the communicating host.

8 Claims, 3 Drawing Sheets

U.S. PATENT DOCUMENTS

| | | | |
|---|---|---|---|
| 7,339,903 B2 * | 3/2008 | O'Neill | 370/313 |
| 7,366,152 B2 * | 4/2008 | O'Neill et al. | 370/338 |
| 2002/0080752 A1 * | 6/2002 | Johansson et al. | 370/338 |
| 2003/0228868 A1 * | 12/2003 | Turanyi et al. | 455/432.1 |
| 2004/0100951 A1 * | 5/2004 | O'neill | 370/389 |
| 2004/0181603 A1 * | 9/2004 | Rajahalme | 709/230 |
| 2004/0260834 A1 * | 12/2004 | Lindholm et al. | 709/238 |
| 2006/0271705 A1 * | 11/2006 | Garcia-Luna-Aceves | 709/242 |
| 2007/0019565 A1 * | 1/2007 | Ishikawa | 370/252 |

OTHER PUBLICATIONS

"Bi-directional Route optimization in Mobile IP over Wireless LAN" by Hsin wu et al.*

"Agent-Based Route Optimization for Mobile IP" by Raghuram Vadali et al 2001 IEEE.*

"A new mobility Management scheme for mobile IP-Based wireless networks" by Chen et al.*

* cited by examiner

SNOOP-AND-SHORTCUT ROUTING METHOD FOR BETTER MOBILITY SUPPORT ON NETWORKS

This application claims priority to U.S. Provisional Appl. Ser. No. 60/339,958, entitled A SNOOP-AND-SHORTCUT ROUTING METHOD FOR BETTER MOBILITY SUPPORT ON NETWORKS, filed Dec. 12, 2001, the disclosure of which is incorporated herein by reference.

FIELD OF THE INVENTION

The present invention relates generally to mobile networking, and more particularly, to a routing method that provides a shortcut for packets communicated between a mobile host on a visiting network and a destination host on that network.

BACKGROUND

Mobile IPv4 and other similar network-layer mobility protocols suffer an inherent drawback known as "detour routing." See C. Perkins, "IP Mobility Support", IETF RFC2002, October 1996, G. Montenegro, "Reverse Tunneling for Mobile IP, revised", IETF RFC3024, January 2001 and R. Jain, et al., "Mobile IP with Location Registers (MIP-LR)", IETF Internet Draft, July 2001. This phenomenon occurs when a visiting mobile host communicates with a host on a visited network, and is depicted schematically in FIG. 1 (where MH stands for Mobile Host, Web for Web server, RT for Router, and HA for Mobile IP Home Agent). For example, when the visiting mobile host 100 attempts to access a local Web server 102, all outbound IP packets are routed via RT 104 to the mobile host's home agent 106 over an intermediate network 107 using an IP tunnel (shown schematically as IP-in-IP packet 108, with the encapsulated inner packet identified at 110), regardless of the destination for these IP packets. The mobile host cannot directly send outbound IP packets to a destination host as regular IP packets using the mobile host's home IP address and the destination host's IP address (as the source and destination IP addresses, respectively), because the mobile host's home IP address may not belong to the visited network. Accordingly, these IP packets may be dropped by routers having a "source filtering" function, which is widely adopted as described in "Reverse Tunneling for Mobile IP, revised", IETF RFC3024, January 2001. Therefore, if the destination host is on the visited network, IP packets from the mobile host are forced to travel round trip between the visited network and the mobile host's home agent 106. This doubles the traffic load on the visited network and all intermediate networks between the visited network and the home agent. It also has a negative impact on the performance of real-time networking applications running between the mobile host and the destination host due to long round-trip delay.

SUMMARY OF THE INVENTION

In accordance with an aspect of the present invention, there is provided a routing technique hereinafter referred to as a snoop and shortcut (SAS) method.

It is an object of the invention to provide an SAS method that can be implemented in routers on any network that support IP tunnels.

It is a further object of the invention to provide an SAS method that is an independent solution implemented in network routers, and therefore does not require cooperation with other components on the network.

It is another object of the invention to reduce detoured routing traffic on a visited network arising from communications between a mobile host on the visited network and a target host on that network.

In accordance with an aspect of the invention, a router receives an IP tunnel packet from a network interface on the visited network, and "snoops" (i.e., checks) the inner IP packet for its final destination. If the destination IP address of the inner IP packet can be reached from the same network interface, which implies the rest of trip for this IP tunnel packet is a needless detour, the router decapsulates the IP tunnel packet and sends the inner IP packet directly to the destination (communicating) host. Thus, for every outbound IP packet sent to the communicating host by the visiting mobile host, a portion of the round trip between the mobile host and its home agent, which could be a very large portion if the router is close to the mobile host, is eliminated. As a result, the traffic load on the network segment between the router and the home agent is reduced and the round trip delay is diminished.

In accordance with an aspect of the invention, there is provided a method for a router to route packets from a visiting host connected to a subnet that is reachable from an ingress interface to the router, to a communicating host on the network, or another subnet that is reachable from another ingress interface to the router. The method comprises the steps of: receiving a packet from the visiting host; ascertaining an address of the communicating host from the packet; and checking if the address of the communicating host for the packet belongs to a subnet that is reachable from an ingress interface to the router, and if the address for the communicating host belongs to the subnet that is reachable from the ingress interface, sending the packet directly to the destination host through the ingress interface.

Optionally, the router can shortcut the IP packets sent from the communicating host that is on a subnet reachable from an ingress interface of the router to the visiting mobile host, provided that the router can detect the moment when the mobile host leaves the network, so that the shortcutting operation can be stopped immediately in order to avoid losing packets from the destination host to the mobile host.

DETAILED DESCRIPTION OF THE PREFERRED EMBODIMENTS

Figure 1:
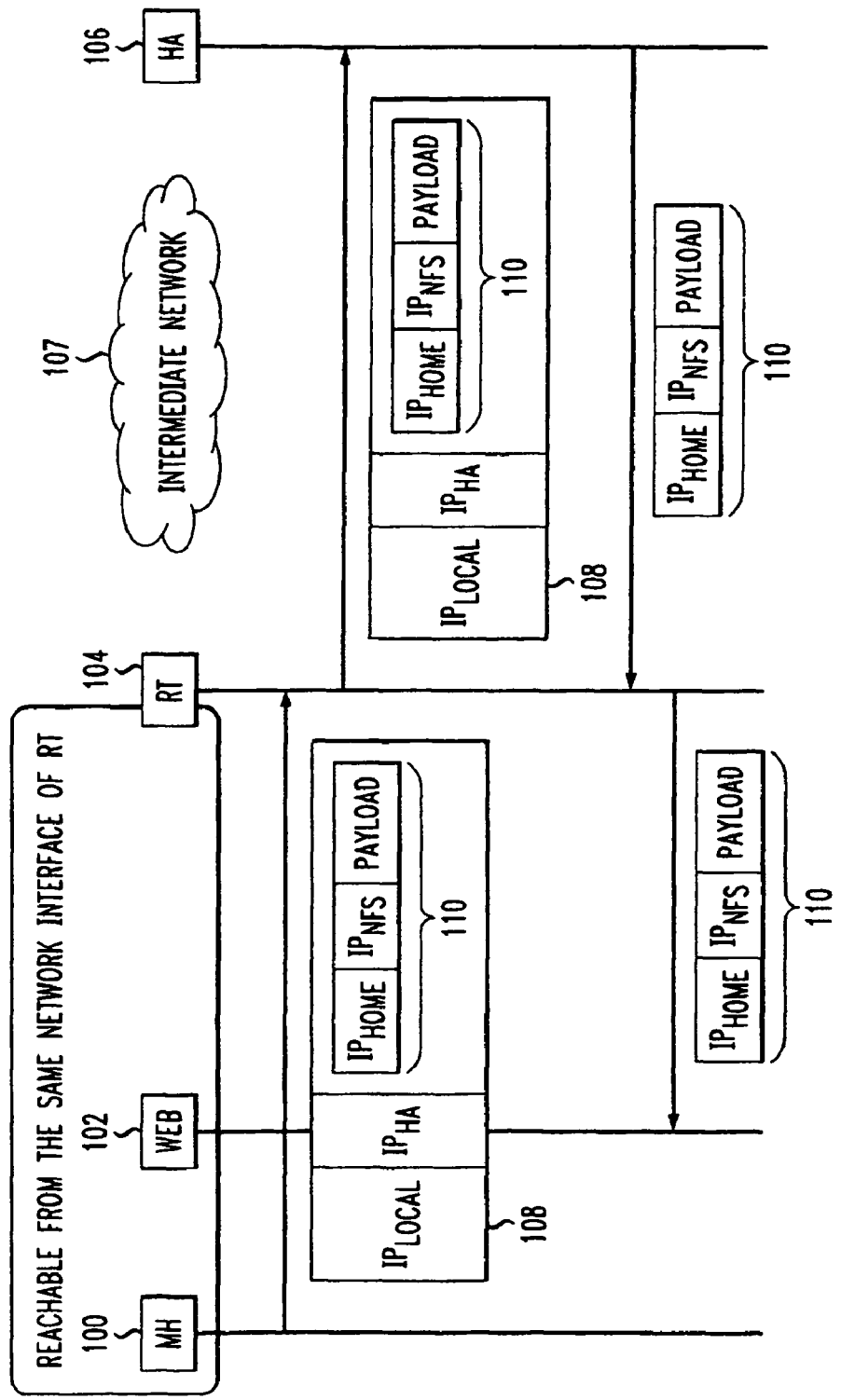
FIG. 1 is a schematic of prior art detour routing using Mobile IP.
Figure 2:
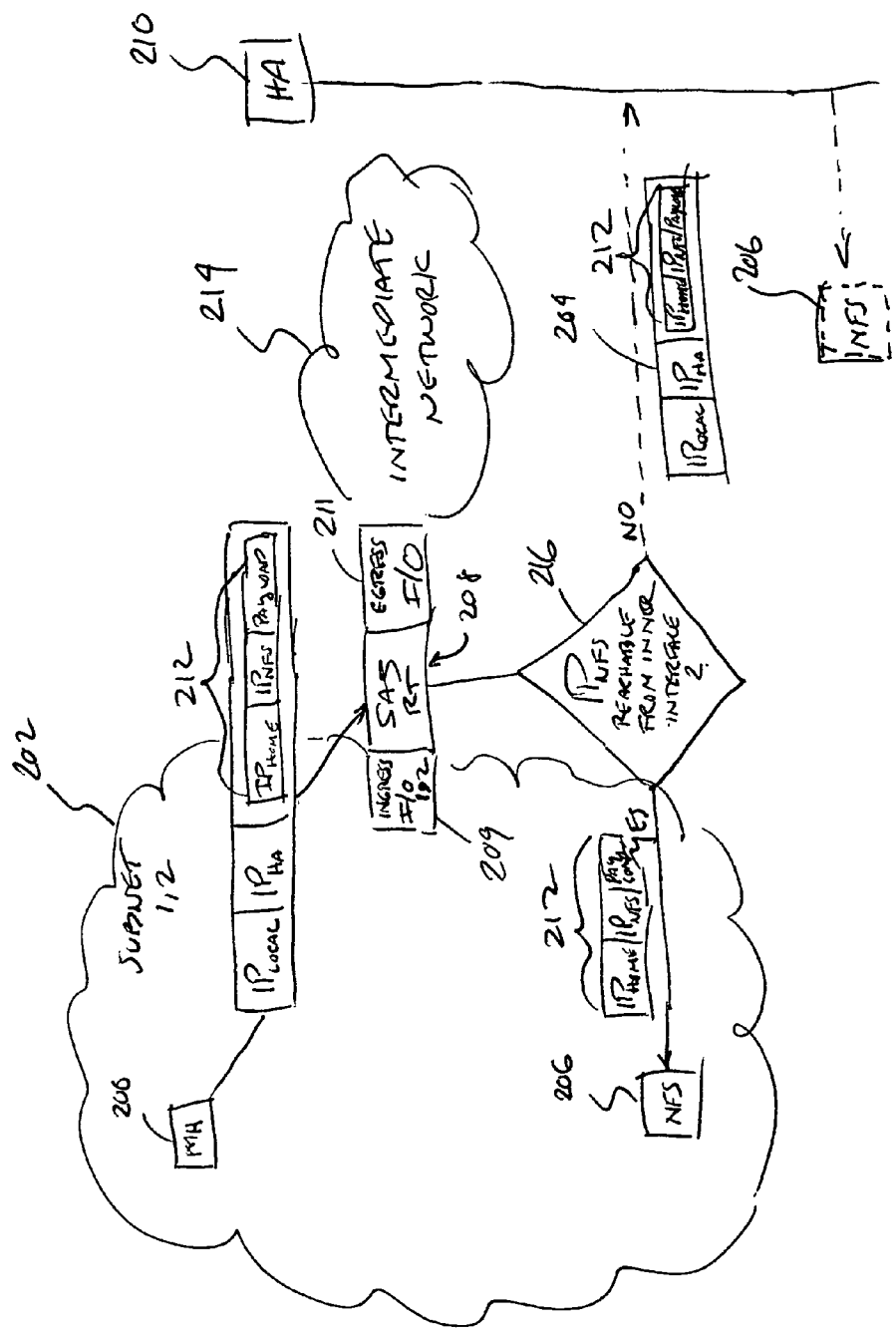
FIG. 2 is a schematic of an SAS routing method in accordance with an aspect of the present invention.

With reference now to the several views of the drawings, there is depicted an SAS routing method that, in the illustrative embodiment, is applied to an application with IP-in-IP packets. It will be appreciated by those skilled in the art that the SAS method can also be employed with IP-in-UDP packets or other IP tunnel packets. In FIG. 2, a mobile host 200 is connected to a foreign access or visited network 202. The mobile host 200 sends a packet, schematically represented at 204, to a communicating host 206 (e.g., a Network File Server (NFS)) on the visited network 202. Packet 204 is shown as an encapsulated IP-in-IP packet of the form [$IP_{local}$, $IP_{HA}$ [$IP_{home}$, $IP_{NFS}$, Payload]]. The packet 204 is initially communicated to a router 208, which is configured so as to "snoop" packets to determine whether it can forward the packet directly to the communicating host 206 on the visited network 202, or whether the packet is to be sent to the mobile host's home agent 210. The router 208 has an ingress interface 209 to network 202 (the subnet) and an egress interface 211 to an external (intermediate) network 214. Normally, the packet 204 is routed to the mobile host's home agent 210 via the intermediate network 214 prior to being rerouted to the communicating host. In accordance with the present invention, whenever the router 208 receives an IP tunnel packet from a network interface on the visited network, the router "snoops" (i.e., checks) the inner IP packet 212 to check the final destination for packet 204. If at 216 the router 208 determines that the destination IP address of the inner IP packet can be reached from the same network interface, the router decapsulates the IP tunnel packet 212 and sends it directly to the communicating host 206 at $IP_{NFS}$. Thus, for each IP packet sent to the communicating host 206, a portion of the round trip between the mobile host 200 and the home agent 210 is eliminated. For those packets destined for a host on another network, the router 208 forwards the packet 204 to the home agent 210 in accordance with conventional practice.

Figure 3:
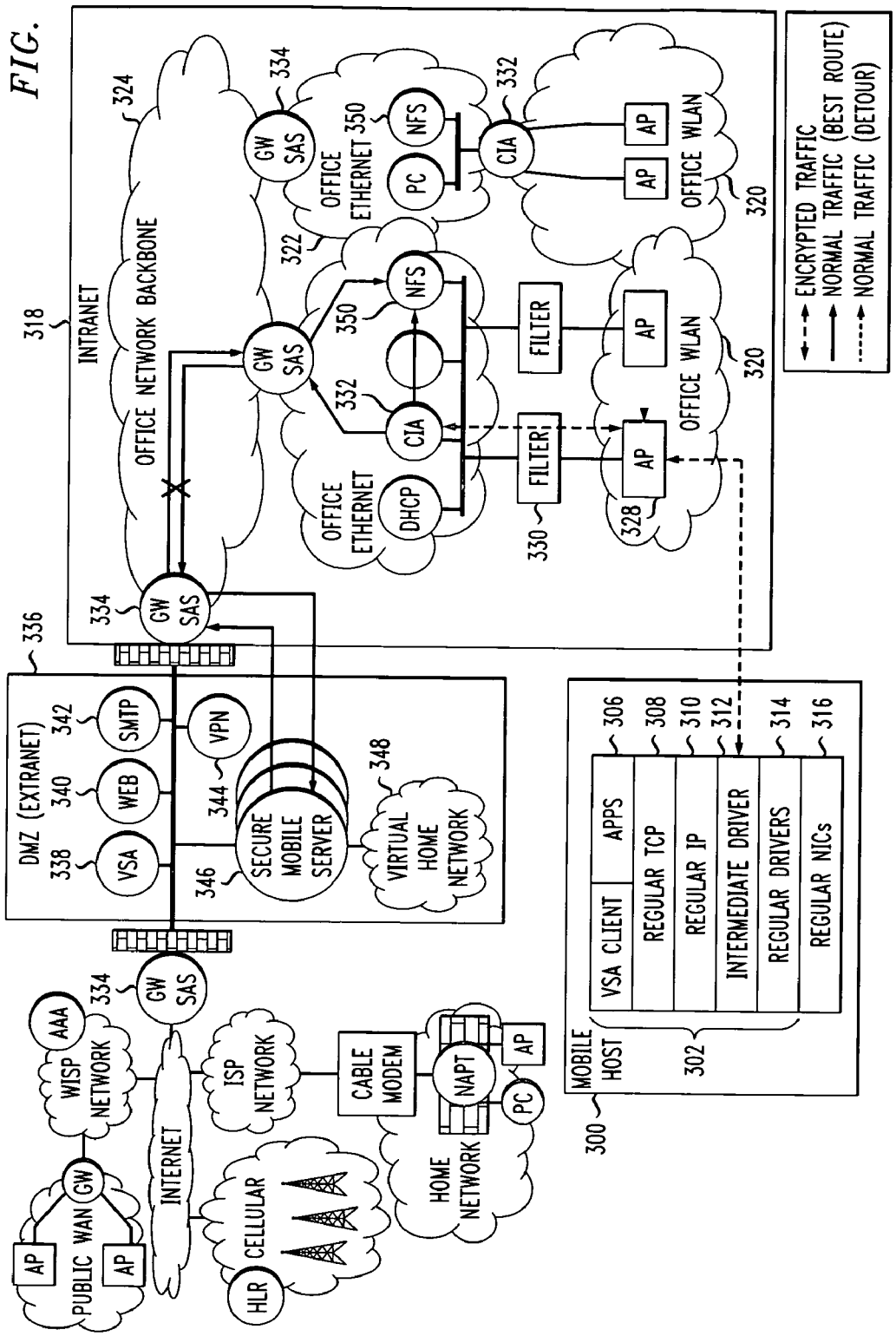
FIG. 3 is a schematic of an exemplary embodiment utilizing the SAS routing method of the present invention in an office LAN environment.

Referring now to FIG. 3, there is depicted an exemplary SAS application in a corporate networking environment where mobility support is provided for both remote access and local access (i.e. access by a user within the corporate network, but not physically at his home location). The mobile host is shown at 300, and includes an illustrative protocol stack 302 that comprises a virtual single account (VSA) client 304, applications 306, a TCP layer 308, IP layer 310, intermediate driver 312, regular drivers 314; and network interface cards (NICs) 316. The VSA is described in co-owned U.S. patent application Ser. No. 10/021,172, filed Oct. 29, 2001, the disclosure of which is incorporated herein by reference. The intermediate driver implements networking functions and is described fully in co-owned U.S. patent application Ser. No. 10/138,129, filed May 5, 2002, the disclosure of which is incorporated herein by reference. These components are not part of the present invention, and thus need not be described in detail here. In order to manage remote access in a secure manner, the corporation typically requires all mobile hosts to belong to a subnet managed by a centralized mobile virtual private network (VPN) server that can be accessed in a limited way from outside the firewall. In FIG. 3, the mobile host 300 communicates over an encrypted link with the company Intranet 318. The Intranet 318 consists of office wide area wireless networks (WLANs) shown generally at 320, office Ethernets 322 and the office network backbone 324. Each WLAN has a plurality of access points (APs) 328 through which the mobile host (or any appropriately configured network access device) can connect to the network. The APs 328 are connected to the Ethernets through filters 330 and a Confidential IP Access (CIA) Server 332. The Ethernets 322 communicate with the office network backbone 324 through gateway routers configured for SAS functions (GW-SAS) 334. Likewise, a GW-SAS 334 interfaces the Intranet 318 to an Extranet 336. The Extranet includes the following functions: VSA 338, Web applications 340, STMP 342, and virtual private network (VPN) 344. A secure mobile server 346 connects to a virtual home network 348.

When the mobile host 300 moves into or is otherwise located within the coverage of the office WLAN 320, a majority of the traffic generated by the mobile host is likely be local, such as, for example, the traffic between the mobile host and network file servers ("wired hosts" or NFSs) deployed on the office Ethernet 322. In accordance with the invention, the traffic from the mobile host 300 to a NFS 350 on the same subnet need not have to travel roundtrip from the mobile host 300 to the centralized Secure Mobility server 346 and thereafter back from the centralized Secure Mobility server 346 to the NFS 350. For the purpose of illustration, the illustrative arrangement assumes that there is a gateway router 334, a visiting mobile host 300, and a wired host (NFS 350). The gateway router 334 has two network interfaces: the inner network interface (ingress interface) that faces a subnet (within Intranet 318), and an external network interface (egress interface) that faces the Extranet 336 or Internet 334. In accordance with conventional practice, the mobile host 300 is provided with a care-of IP address on the subnet, which is denoted as $IP_{local}$. Its home IP address belongs to another network represented by the centralized Secure Mobility server 346, which is denoted as $IP_{home}$. The IP address of the Secure Mobility server 346 is denoted as $IP_{HA}$. The NFS 350 is on the subnet, and has IP address=$IP_{wired}$.

When the visiting mobile host 300 is communicating with NFS 350. Every outbound IP packet sent to NFS 350 from the mobile host is an IP-in-IP packet of the form [$IP_{local}$, $IP_{HA}$, [$IP_{home}$, $IP_{wired}$, Payload]], were the source and destination IP addresses for the outer IP packet are $IP_{local}$ and $IP_{HA}$ respectively; and the source and destination IP addresses for the inner IP packet are $IP_{home}$ and $IP_{wired}$ respectively. Since the Secure Mobility server is disposed on another network, the packet from the NFS 350 is sent to the gateway router (GW-SAS) 334 by the mobile host 300. The GW-SAS 334 "snoops" the inner IP packet and determines that the destination IP address, $IP_{wired}$, belongs to the subnet from this IP-in-IP packet comes from. Accordingly, the GW-SAS 334 directly sends the inner IP packet, [$IP_{home}$, $IP_{wired}$, Payload], back to the NFS 350. Thus, the packet need not travel roundtrip between the GW-SAS 334 and the Secure Mobility server 346, thereby eliminating packet travel time between the source and destination.

If the gateway router can detect whether the visiting mobile host is still reachable using the care-of IP address, $IP_{local}$, it can snoop and shortcut IP packets sent from the wired host on the subnet to the mobile host. Since the wired host is not aware of mobility, it sends regular IP packets having the form [$IP_{wired}$, $IP_{home}$, Payload]. Since the home IP address of the mobile host, $IP_{home}$, belongs to another network, this packet is delivered to the gateway router. If the gateway router knows the visiting mobile host is still reachable using $IP_{local}$ that belongs to current subnet, it can encapsulate this IP packet into an IP-in-IP packet [$IP_{HA}$, $IP_{local}$, [$IP_{wired}$, $IP_{home}$, Payload]], and send it back to the mobile host, thereby eliminating the round trip between the gateway router and the Secure Mobility server for this packet.

The present invention has been shown in what are considered to be the most practical and preferred embodiments. It is anticipated, however, that departures can be made therefrom and that obvious modifications will be implemented by those skilled in the art.

We claim:

1. In a router, a method to route packets from a visiting host connected to a first subnet that is reachable from a first ingress interface to the router, to a communicating host on the first subnet or a second subnet that is reachable from a second ingress interface to the router, comprising the steps of:

receiving a packet from the visiting host;

examining the packet and ascertaining an address of the communicating host from the packet; and checking if the address of the communicating host for the packet belongs to one of the subnets that are reachable from a one of the ingress interfaces to the router, and if the address of the communicating host belongs to one of the subnets that are reachable from one of the ingress interfaces, sending the packet directly to the communicating host through one of the ingress interfaces, and if the address of the communicating host does not belong to one of the subnets, sending the packet to a home agent for the visiting host to enable the packet to be routed to the communicating host.

2. The method recited in claim 1, wherein if the communicating host does not belong to any subnets that are reachable through an ingress interface of the router and the home agent is not reachable from any ingress interfaces of the router, further comprising the step of sending the packet to the home agent of the visiting host through an egress interface of the router.

3. The method recited in claim 1, wherein the step of checking if the address of the communicating host belongs to one of the subnets that are reachable from an ingress interface, comprises checking an inner packet of an encapsulated IP tunnel packet.

4. The method recited in claim 1, further comprising the steps of:
  receiving the packet that is sent to the visiting host from the communicating host on a subnet that is reachable from an ingress interface of the router;
  determining whether the visiting host is on a subnet that is reachable from an ingress interface;
  if the visiting host is reachable, sending the packet directly to the visiting host through the ingress interface.

5. The method recited in claim 4, further comprising the step of encapsulating an IP packet received from the communicating host into an IP-in-IP packet, or an IP-in-UDP packet, or another form of encapsulated IP packet.

6. In a router, a method to route packets from a visiting host connected to a first subnet that is reachable from a first ingress interface of the router, to a communicating host on the first subnet, or a second subnet that is reachable from a second ingress interface of the router, comprising the steps of:
  receiving a packet from the visiting host;
  examining the packet and ascertaining an address of the communicating host from the packet; and
  checking if the address of the communicating host for the packet belongs to either of the subnets that are reachable from the ingress interfaces of the router, and if the communicating host belongs to the subnets that are reachable from the ingress interfaces, sending the packet directly to the communicating host;
  receiving a packet from the communicating host that is destined for the visiting host;
  determining whether the visiting host is on one of the subnets; and
  if the visiting host is on one of the subnets, sending the packet directly to the visiting host through one of the ingress interfaces, and if the address of the communicating host does not belong to one of the subnets, sending the packet to a home agent for the visiting host to enable the packet to be routed to the communicating host.

7. The method recited in claim 6, wherein if the communicating host does not belong to any subnets that are reachable through an ingress interface of the router, further comprising the step of sending the packet to the home agent of the visiting host through an egress interface of the router.

8. The method recited in claim 6, wherein if the visiting host is not on the subnet, sending the packet destined for the visiting host to the home agent for the visiting host.

* * * * *